United States Patent
Ganesh et al.

(10) Patent No.: US 7,302,611 B2
(45) Date of Patent: Nov. 27, 2007

(54) DISTRIBUTED EXPERT SYSTEM FOR AUTOMATED PROBLEM RESOLUTION IN A COMMUNICATION SYSTEM

(75) Inventors: Sangeetha Ganesh, Woodbridge, NJ (US); Constantine Osiakwan, Jackson, NJ (US); Adonny Raphael, Holmdel, NJ (US); Jerzy Wirecki, Middletown, NJ (US); Marian J. Zarnowski, Longmont, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 571 days.

(21) Appl. No.: 10/939,694

(22) Filed: Sep. 13, 2004

(65) Prior Publication Data

US 2006/0069957 A1 Mar. 30, 2006

(51) Int. Cl.
*G06F 11/00* (2006.01)
(52) U.S. Cl. .................................................. 714/26
(58) Field of Classification Search .................. 714/26, 714/47, 48, 457; 709/223–224; 370/241, 370/242
See application file for complete search history.

(56) References Cited

U.S. PATENT DOCUMENTS 4,972,453 A 11/1990 Daniel, III et al.
5,651,006 A * 7/1997 Fujino et al. ............... 370/408
5,664,093 A * 9/1997 Barnett et al. ................ 714/31
5,761,502 A 6/1998 Jacobs
6,012,152 A * 1/2000 Douik et al. ................... 714/26
6,192,402 B1 * 2/2001 Iwase .......................... 709/223
6,226,273 B1 * 5/2001 Busuioc et al. ............. 370/270
6,233,449 B1 * 5/2001 Glitho et al. ............... 455/423
6,266,694 B1 7/2001 Duguay et al.
6,420,968 B1 7/2002 Hirsch
6,484,155 B1 * 11/2002 Kiss et al. ..................... 706/46
6,539,416 B1 * 3/2003 Takewaki et al. ........... 709/202
6,886,024 B1 * 4/2005 Fujita et al. ................ 709/201
6,950,782 B2 * 9/2005 Qiao et al. .................. 702/183
7,127,441 B2 * 10/2006 Musman ....................... 706/47
2001/0013107 A1 8/2001 Lewis
2004/0196794 A1 * 10/2004 Fu .............................. 370/254

FOREIGN PATENT DOCUMENTS

EP 1 063 815 A2 12/2000
EP 05 25 5130 12/2005

* cited by examiner

*Primary Examiner*—Robert Beausoliel
*Assistant Examiner*—Amine Riad
(74) *Attorney, Agent, or Firm*—Ryan, Mason & Lewis, LLP

(57) ABSTRACT

A communication system processing element comprises a processor coupled to a memory and implements at least a portion of a distributed expert system. The distributed expert system is arranged in at least two hierarchical levels, including an upper level comprising a central controller, and a lower level comprising a plurality of local agents each associated with one or more communication devices of the system.

19 Claims, 4 Drawing Sheets

DISTRIBUTED EXPERT SYSTEM FOR AUTOMATED PROBLEM RESOLUTION IN A COMMUNICATION SYSTEM

FIELD OF THE INVENTION

The invention relates generally to the field of communication systems, and more particularly to expert systems that are configured to provide automated assistance in resolving communication device problems in such systems.

BACKGROUND OF THE INVENTION

In conventional practice, certain communication devices may be configured to generate alarms and to report any such alarms directly to a centralized expert system for trouble ticket generation, problem analysis, testing, and eventual resolution of device problems. Resolution of a particular device problem using this approach generally requires the centralized expert system to be connected directly to the affected device, in order to perform tests and to clear the problem. Unfortunately, this is typically not an optimal solution for most communication device users as it may compromise their network security. Also, human intervention is frequently required in order to provide a satisfactory resolution to the problem. Thus, the time and resources required to resolve a problem using this approach can often be excessive, leading to increased costs for both the device user and the service provider.

Another drawback is that the conventional approach is not readily scalable. This is because the centralized expert system, which is typically accessed for any problem to be resolved, presents a significant processing bottleneck. Of course, the severity of the bottleneck increases with the number of communication devices to be supported.

Accordingly, a need exists for an improved approach to resolving communication device problems, that does not suffer from the drawbacks associated with the conventional requirement of direct interaction between a given device and a centralized expert system in order to provide a satisfactory resolution to a device problem.

SUMMARY OF THE INVENTION

The present invention meets the above-identified need by providing, in an illustrative embodiment, a distributed expert system which facilitates local resolution of communication device problems.

In accordance with one aspect of the invention, a communication system processing element comprises a processor coupled to a memory and implements at least a portion of a distributed expert system. The distributed expert system is arranged in at least two hierarchical levels, including an upper level comprising a central controller, and a lower level comprising a plurality of local agents each associated with one or more communication devices of the system.

The distributed expert system may also comprise at least a first intermediary hierarchical level arranged between the upper level and the lower level, the first intermediary level comprising a plurality of active managers, each managing one or more of the local agents.

The distributed expert system may further comprise an additional intermediary hierarchical level arranged between the first intermediary level and the upper level, the additional intermediary level comprising at least one management element responsible for managing a plurality of the active managers of the first intermediary level.

In accordance with another aspect of the invention, the central controller has an associated knowledge base for use in automated resolution of communication device problems in the communication system. The local agents have respective local knowledge bases each of which comprises only a subset of the knowledge base of the central controller. If a given one of the local agents encounters a problem with one of its associated communication devices that is not solvable using a local knowledge base, it requests problem resolution assistance from the central controller. Alternatively or additionally, the given local agent may obtain new problem resolution knowledge without accessing the central controller. In this case, the new problem resolution knowledge may be subsequently submitted by the local agent to the central controller for processing so as to make the new problem resolution knowledge accessible to at least one additional local agent.

In the illustrative embodiment, the central controller comprises a centralized expert system (CES), the local agents comprise local active healing agents (LAHAs), and the active managers comprise active healing agent managers (AHAMs).

The distributed expert system in the illustrative embodiment provides a number of significant advantages relative to conventional arrangements. For example, as indicated previously, such a system can resolve many device problems locally, utilizing the LAHAs, thereby avoiding the security and cost issues associated with the conventional requirement of direct interaction between the device and the CES. The need for human intervention is significantly reduced, as are the time and resources required to resolve a given problem. Another advantage is that statistics can be gathered locally, thereby facilitating problem resolution at the local level. The distributed expert system in the illustrative embodiment is also readily scalable to accommodate communication systems with large numbers of monitored devices.

DETAILED DESCRIPTION OF THE INVENTION

The invention will be described below in conjunction with an exemplary communication system comprising a plurality of communication devices and a distributed expert system. It should be understood, however, that the invention is not limited to use with any particular type of communication system or any particular configuration of communication devices or other processing elements of the system. Those skilled in the art will recognize that the disclosed techniques may be used in any communication system application in which it is desirable to provide improved resolution of communication device problems.

Figure 1:
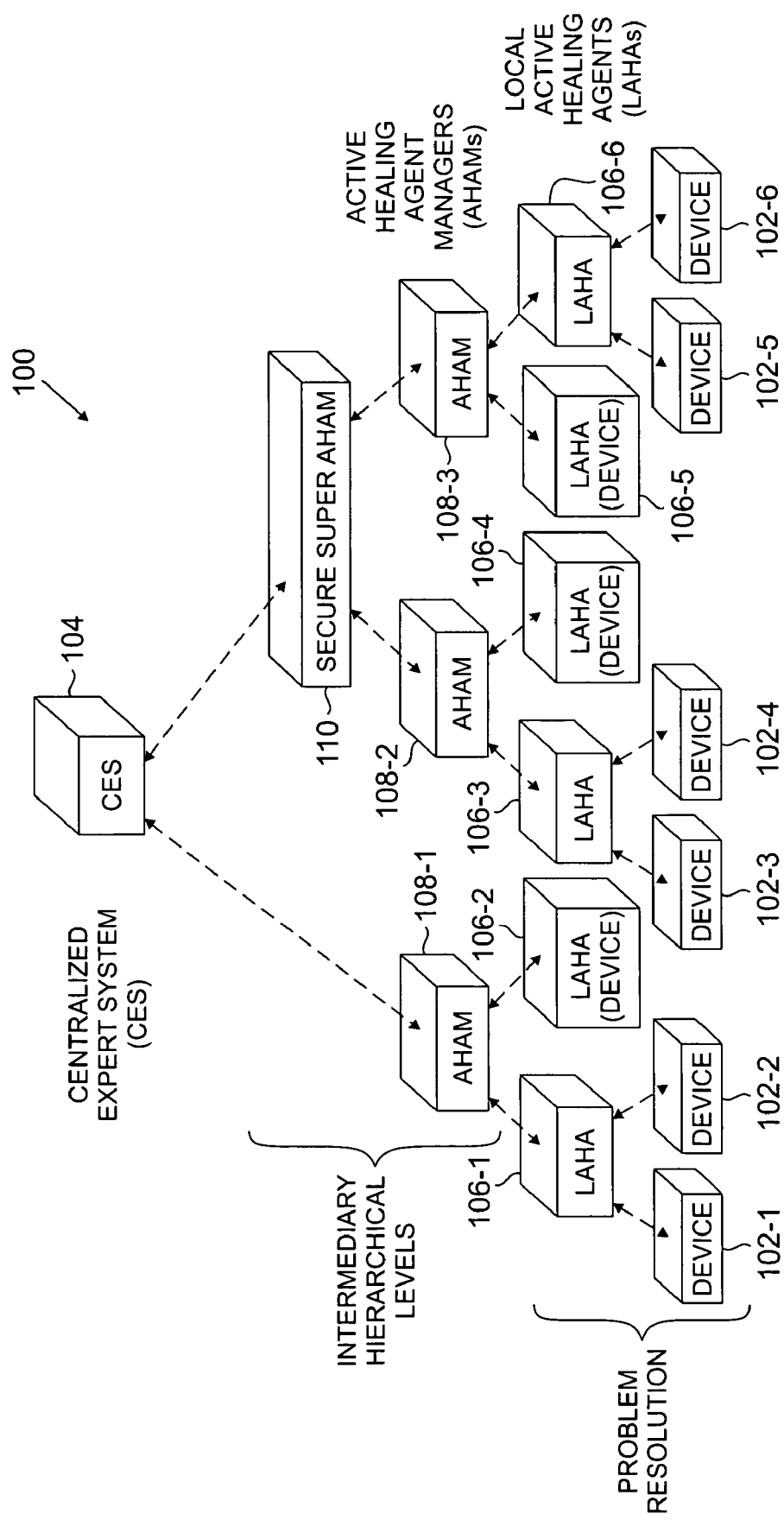
FIG. 1 shows an exemplary communication system comprising a plurality of communication devices and a distributed expert system, in accordance with an illustrative embodiment of the invention.

FIG. 1 shows an example of a communication system 100 in which the present invention is implemented. The system 100 comprises a plurality of communication devices 102, individually denoted 102-1, 102-2, . . . 102-6, and a distributed expert system comprising elements 104, 106, 108 and 110 arranged as shown. Element 104 is a central controller, illustratively implemented in this embodiment as a centralized expert system (CES), although other types of central controllers could be used. The distributed expert system is generally arranged in a hierarchy, with the CES 104 at an upper level of the hierarchy, and a plurality of local active healing agents (LAHAs) 106 at a lower level of the hierarchy. The elements 102, 104, 106, 108 and 110 of system 100 are examples of what are more generally referred to herein as "processing elements."

The CES 104 may be configured to "learn" about resolving communication device problems from one or more human experts, in a conventional manner. However, in accordance with an aspect of the invention, the CES is also operative to validates solutions recommended by the LAHAs, and to distribute such new knowledge to other LAHAs, via one or more AHAMs if applicable, as will be described in greater detail below.

LAHAs are generally responsible for problem resolution for one or more communication devices. The LAHAs 106 are individually denoted as LAHAs 106-1, 106-2, . . . 106-6. Each of the LAHAs 106 either interacts directly with one or more of the devices 104, or itself comprises a communication device. Thus, the LAHA functionality as described herein may be implemented within a given communication device. In the figure, LAHAs 106-2, 106-4 and 106-5 are implemented as communication devices, and thus may have, in addition to their LAHA functionality, user communication functionality similar to that of one or more of the communication devices 104. LAHAs 106-1, 106-3 and 106-6 are associated with respective pairs of devices, namely, devices 102-1 and 102-2, devices 102-3 and 102-4, and devices 102-5 and 102-6, respectively, as indicated in the figure.

The LAHAs may be configured to perform functions such as monitoring their associated devices, resolving problems with the devices using embedded knowledge bases, determining solutions to new problems from external sources, recommending solutions to the CES, and communicating unknown problems to the CES. A given LAHA may accept new knowledge related to problem resolution from other system components, such as the CES, after such new knowledge is validated, approved and updated by the CES. The LAHAs can also gather problem resolution statistics or other statistics on a local level. As indicated previously, a given LAHA can be embedded in a communication device. Thus, a given LAHA may reside on a device that it serves, or it may reside on a separate server or other processing element. Also, as is apparent from the figure, a single LAHA may serve multiple devices or device platforms. The LAHAs can also be on separate networks.

An optional intermediary hierarchical level, arranged between the highest and lowest levels, comprises a number of active healing agent managers (AHAMs) 108, individually denoted as AHAMs 108-1, 108-2 and 108-3, and a secure "super" AHAM 110. Each of the AHAMs 108 manages one or more of the LAHAs 106. As shown, AHAM 108-1 manages LAHAs 106-1 and 106-2, AHAM 108-2 manages LAHAs 106-3 and 106-4, and AHAM 108-3 manages LAHAs 106-5 and 106-6. A given super AHAM manages multiple AHAMs. In this example, super AHAM 110 manages AHAMs 108-2 and 108-3.

The AHAMs 108 are generally configured to transmit information between the LAHAs 106 and the CES 104. A given AHAM may be configured to provide support for a group of LAHAs having certain common characteristics, such as product type, product release, customer ownership, geographical location, etc.

A given LAHA may communicate to its associated AHAM information specifying one or more device problems that the LAHA is unable to resolve and for which the LAHA wants a solution provided by the CES. Also, the LAHA can communicate, to its associated AHAM, solutions to new problems that the LAHA has discovered and would like to recommend to the CES. Problem resolution statistics, or other locally-gathered statistics, may also be communicated from the LAHAs to the CES via the AHAMs. The AHAMs serve to communicate the needed information between the LAHAs and AHAMs as needed.

The LAHAs may be viewed as autonomous agents in the sense that they do not require any other agent or the CES to deal with their respective problem domains. The LAHAs generally do not communicate with each other.

Communications between the CES and the LAHAs, via the AHAMs if present, may be established on a "set-up and tear-down" basis. In the illustrative embodiment, there are no direct links between LAHAs. The LAHAs must be registered with or otherwise authorized by the CES to be able to use the CES knowledge base. The CES may independently pursue new knowledge for all possible problems that its associated LAHAs may encounter, and may distribute the resulting new knowledge as needed.

Although shown as physically separate entities in the figure, the AHAMs and LAHAs may be co-located on a common processing platform. It is also possible for the AHAM functionality to be part of a given LAHA, with one AHAM per physical location, per customer, etc. An AHAM generally does not maintain a knowledge base for problem resolution, but instead may perform management-related functions such as maintaining event logs, lists of pending tasks or actions, and the like.

Information utilized by the various LAHAs 106 in resolving device problems is generally stored in a knowledge base in the CES 104. The LAHAs also have their own individual knowledge bases which will typically differ from LAHA to LAHA. More specifically, each LAHA need have in its own knowledge base only the information that is required to deal with problems specific to the communication devices that are associated with that LAHA. Thus, the knowledge base of the CES is in effect distributed among the LAHAs so as to permit local resolution of device problems. A given LAHA is configured to detect problems on its associated devices and to attempt to resolve the problems based on its knowledge base. The LAHA also intelligently develops its knowledge base over time through monitoring the resolution of new problems. Knowledge gained by one LAHA in resolving a new problem can be communicated to other LAHAs that can use the knowledge to resolve the same or similar problems when they arise on devices that are local to those LAHAs.

Any such new knowledge gained by a given one of the LAHAs is communicated, via one or more AHAMs or otherwise, to the CES. After the CES validates, approves or otherwise processes the new knowledge, it may be distributed, again via AHAMs or otherwise, to one or more additional LAHAs as needed. The CES will generally determine whether the new knowledge is to be distributed to all LAHAs or only a selected subset of LAHAs based on the characteristics of the knowledge and the characteristics of each LAHA as specified, for example, in a LAHA registry of the CES.

An AHAM may be configured to provide, in an initiation phase of operation or otherwise, an automatic broadcast update to all of its associated LAHAs. A given LAHA, upon its initialization or otherwise, may send new information via its associated AHAM for verification and ultimate integration in the CES. These and other operations of the LAHAs and AHAMs may be performed at regular time intervals, such as daily, weekly, etc., and possibly during off-peak periods. It is also possible for the operations to be performed on an as needed basis, as when an AHAM has new information that should be distributed to LAHAs, or on demand, as when a LAHA requests an update or pushes new information to an AHAM.

Techniques such as data compression and encryption may be used for communications between the LAHAs and AHAMs, and for other inter-element communications in the system 100.

It should be noted that a variety of alternative arrangements of hierarchical levels may be used in implementing the present invention. For example, additional levels may be present between the CES and the AHAMs, between the AHAMs and the LAHAs, or between the LAHAs and the communication devices, as will be appreciated by those skilled in the art.

A given one of the communication devices in system 100, whether the device is one of the devices 102 or one of the LAHAs 106, may comprise, by way of example, a mobile communication device, such as a mobile telephone, personal digital assistant (PDA) or portable computer, or a non-mobile communication device, such as a desktop computer, a server or a set of servers, or more generally any other type of processor-based device or set of devices suitably configured for communication within system 100. Conventional aspects of these and other devices utilizable in system 100 are well known in the art and therefore not described in further detail herein.

Although not shown in the figure, one or more networks may be used to interconnect the communication devices of the system 100. Such networks may comprise, by way of example, a global communication network such as the Internet, an intranet, a wide area network, a metropolitan area network, a local area network, a wireless cellular network, or a satellite network, as well as portions or combinations of these or other wired or wireless communication networks. Implementation of the present invention thus does not require any particular type of network or set of networks.

The system 100 may include additional elements not explicitly shown in the figure, such as routers, gateways or other network elements. The system may also or alternatively include one or more communication system switches, such as a DEFINITY® Enterprise Communication Service (ECS) communication system switch available from Avaya Inc. of Basking Ridge, N.J., USA. As another example, a given communication switch utilizable in conjunction with the present invention may comprise MultiVantage™ communication system software, also available from Avaya Inc. The term "processing element" as used herein is intended to include such switches, as well as routers, gateways or other network elements.

It is therefore to be appreciated that the present invention does not require the particular arrangements shown in FIG. 1, and numerous alternative configurations suitable for providing the distributed expert system functionality described herein will be readily apparent to those skilled in the art.

Figure 2:
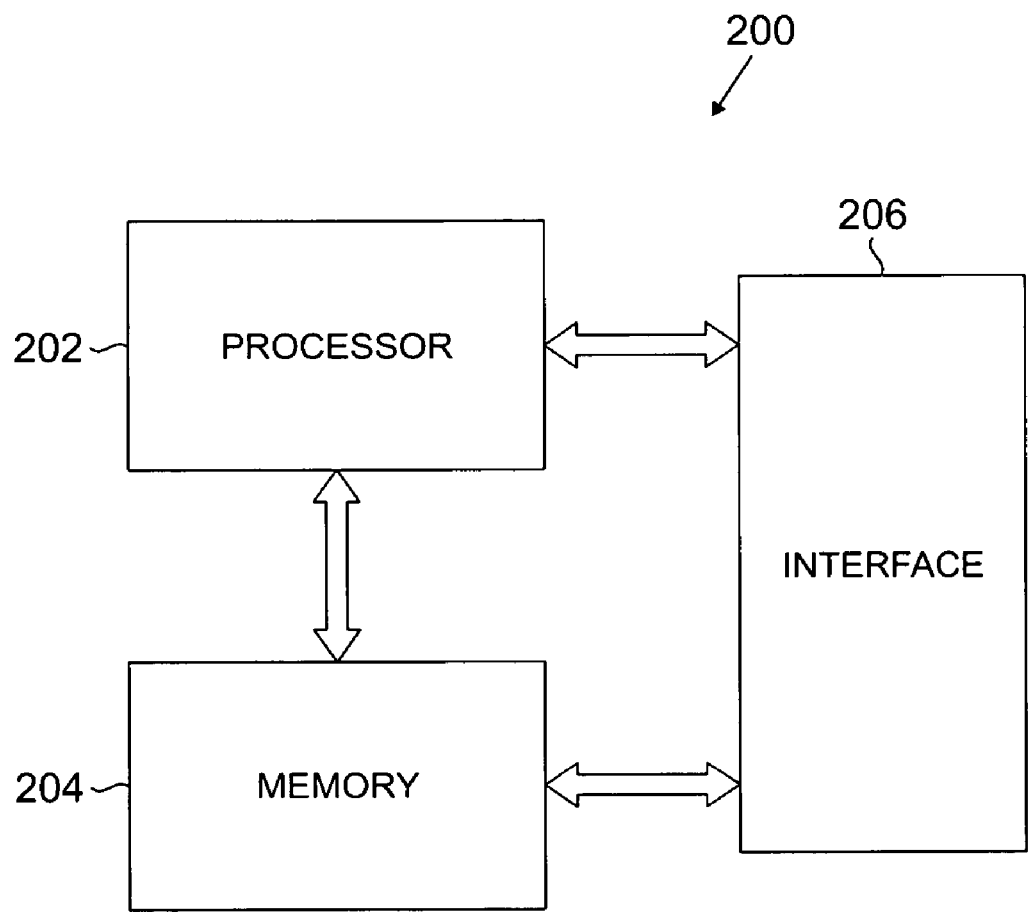
FIG. 2 is a simplified block diagram showing one possible implementation of a given processing element of the FIG. 1 system.

FIG. 2 shows one possible implementation of a given processing element 200 of the FIG. 1 system. The processing element 200 may correspond, by way of example, to a given communication device, LAHA, AHAM, super AHAM or CES, or portions or combinations of such elements. The processing element 200 as shown in the figure includes a processor 202 coupled to a memory 204 and one or more interfaces 206. The techniques of the present invention may be implemented at least in part in the form of software storable in the memory 204 and executable by the processor 202. The memory 204 may represent random access memory (RAM), read-only memory (ROM), optical or magnetic disk-based storage, or other storage elements, as well as portions or combinations thereof.

Those skilled in the art will recognize that the individual elements of FIG. 2 as shown for illustrative purposes may be combined into or distributed across one or more processing devices, e.g., a microprocessor, an application-specific integrated circuit (ASIC), a computer or other device(s).

The FIG. 2 arrangement is also considerably simplified for purposes of illustration. For example, if viewed as representative of a mobile telephone, the processing element 200 may include conventional elements typically associated with such a device, such as codecs and other voice signal processing hardware or software elements.

An illustrative set of processing operations implemented in the distributed expert system of FIG. 1 will now be described with reference to the flow diagram of FIG. 3. It is assumed for this example that the CES includes an initial knowledge base for dealing with one or more problems that may arise in the system 100.

Figure 3:
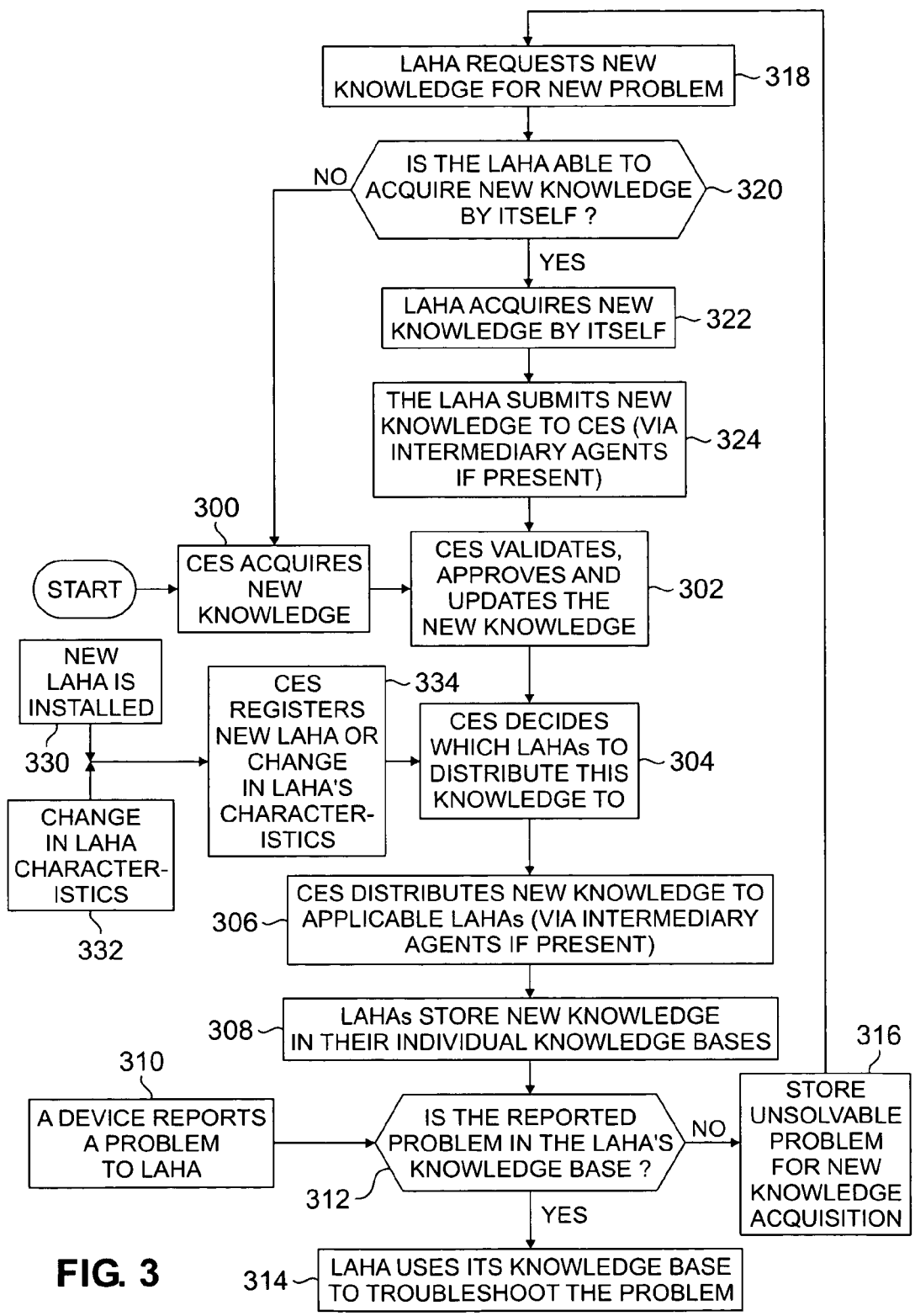
FIG. 3 is a flow diagram showing the operation of the distributed expert system of FIG. 1 in resolving device problems in the illustrative embodiment.

At the start of the FIG. 3 process, the CES 104 in step 300 acquires new knowledge. Such new knowledge may comprise, for example, information specifying one or more aspects of a given problem, or of a resolution of the problem. In step 302, the CES validates, approves and updates the new knowledge, if appropriate. Then, in step 304, the CES decides which of the LAHAs 106 this new knowledge should be distributed to. The new knowledge is then distributed to the applicable LAHAs, via the associated intermediary agents, such as AHAMs 108, if present, as indicated in step 306. Then, in step 308, the applicable LAHAs store the new knowledge in their respective individual knowledge bases.

At step 310 of the process, a communication device 102 reports a problem to its associated LAHA 106. A determination is made in step 312 as to whether the reported problem is in the knowledge base of that LAHA. If the reported problem is in the knowledge base of the LAHA, the LAHA uses its knowledge base to troubleshoot the problem, as indicated in step 314. Otherwise, the reported problem is stored in step 316 as a new or "unsolvable" problem for which new knowledge acquisition is appropriate. The LAHA in step 318 then requests new knowledge for the new problem. If it is determined in step 320 that the LAHA is able to acquire such new knowledge by itself, the LAHA acquires the new knowledge by itself as indicated in step 322. The LAHA in step 324 then submits the new knowledge to the CES, via one or more intermediary agents such as AHAMs 108 if present. The process then returns to step 302 for the CES to validate, approve and update the new knowledge.

In the event a new LAHA is installed in system 100, as indicated in step 330, or there is a change in LAHA characteristics, as indicated in step 332, the CES in step 334 registers the new LAHA or the change in LAHA characteristics. The process then returns to step 304 as indicated in the figure.

It is to be appreciated that the particular processing operations shown in the FIG. 3 process are presented by way of illustrative example only, and should not be viewed as requirements of the invention. Numerous alternative processing operations may be used in implementing a distributed expert system in accordance with the invention.

Figure 4:
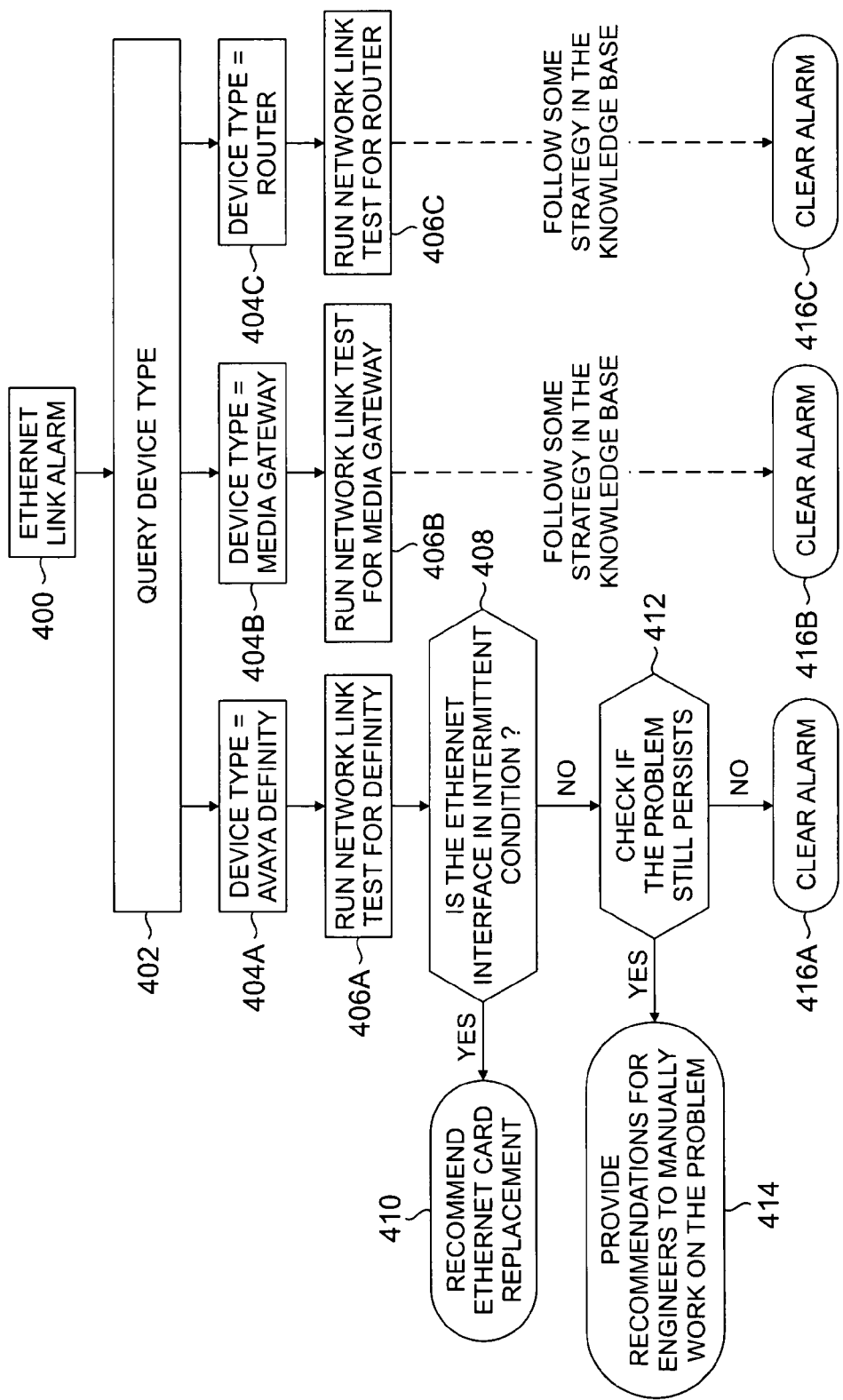
FIG. 4 is a flow diagram of a piece of knowledge comprising a rule-based strategy that may be stored in a knowledge base of the distributed expert system of FIG. 1.

FIG. 4 shows one example of a piece of knowledge comprising a rule-based strategy that may be stored in a knowledge base of the distributed expert system of FIG. 1. The knowledge base in which such knowledge is stored may be a CES knowledge base or a LAHA knowledge base. This particular rule-based strategy is responsive to an Ethernet link alarm 400 and upon receipt of such an alarm initiates a query regarding device type as indicated at 402. The possible device types in this example include an Avaya DEFINITY® device type 404A, a media gateway device type 404B, and a router device type 404C. Depending on whether the device type is 404A, 404B or 404C, respective network link test 406A, 406B or 406C is run.

In conjunction with the network link test initiated at 406A for the Avaya DEFINITY® device type 404A, a determination is made in step 408 as to whether the Ethernet interface is in intermittent condition. If so, step 410 indicates a recommendation to replace the Ethernet card. Otherwise, a check is made in step 412 to determine if the problem still persists. If it does, recommendations may be provided for engineers to manually work on the problem, as indicated in step 414. If the problem does not persist in step 412, the alarm is cleared as indicated at 416A. Similarly, network link tests 406B and 406C may be run, each following some strategy in the knowledge base, until clearing of the respective alarms as indicated at 416B and 416C.

Again, the knowledge comprising the rule-based strategy of FIG. 4 is presented by way of illustrative example only. Numerous alternative strategies or other types of knowledge may be utilized in a distributed expert system in accordance with the invention.

The distributed expert system shown in FIG. 1 provides a number of significant advantages relative to conventional arrangements. For example, such a system can resolve many device problems locally, via the LAHAs, thereby avoiding the security and cost issues associated with the conventional requirement of direct interaction between the device and the CES. The need for human intervention is significantly reduced, as are the time and resources required to resolve a given problem. This reduces device downtime and provides better service to customers. Another advantage is that the LAHAs can be used to gather statistics locally, thereby facilitating problem resolution at the local level. Only if a given problem cannot be resolved locally is it necessary to utilize the CES for its resolution. The distributed expert system in the illustrative embodiment is also readily scalable to accommodate communication systems with large numbers of monitored devices.

As previously noted, one or more of the processing functions described above in conjunction with the illustrative embodiment of the invention may be implemented in whole or in part in software utilizing processor 202 and memory 204 associated with a processing element of the system. Other suitable arrangements of hardware, firmware or software may be used to implement the techniques of the invention.

It should again be emphasized that the above-described arrangements are illustrative only. For example, alternative embodiments may utilize different processing element configurations, different processing operations, and different communication protocols than those of the illustrative embodiment. These and numerous other alternative embodiments within the scope of the following claims will be apparent to those skilled in the art.

What is claimed is:

1. An apparatus for use in a communication system, the apparatus comprising:
    a processing element comprising a processor coupled to a memory;
        the processing element implementing at least a portion of a distributed expert system for automated resolution of communication device problems in the communication system, the distributed expert system being arranged in at least two hierarchical levels, including an upper level comprising a central controller and a lower level comprising a plurality of local agents each associated with one or more communication devices of the system;
    wherein a given one of the local agents obtains new problem resolution knowledge without accessing the central controller.

2. The apparatus of claim 1 wherein the central controller comprises a centralized expert system (CES).

3. The apparatus of claim 1 wherein at least one of the plurality of local agents comprises a local active healing agent (LAHA).

4. The apparatus of claim 1 wherein the distributed expert system further comprises at least a first intermediary hierarchical level arranged between the upper level and the lower level, the first intermediary level comprising a plurality of active managers, each managing one or more of the local agents.

5. The apparatus of claim 4 wherein at least one of the plurality of active managers comprises an active healing agent manager (AHAM).

6. The apparatus of claim 4 wherein the distributed expert system further comprises an additional intermediary hierarchical level arranged between the first intermediary level and the upper level, the additional intermediary level comprising at least one management element responsible for managing a plurality of the active managers of the first intermediary level.

7. The apparatus of claim 1 wherein the central controller determines, for new problem resolution knowledge it obtains, which of the plurality of local agents to which the knowledge will be distributed.

8. The apparatus of claim 1 wherein the new problem resolution knowledge obtained by the local agent without accessing the central controller is subsequently submitted by the local agent to the central controller for processing by the central controller so as to make said new problem resolution knowledge accessible to at least one additional local agent.

9. The apparatus of claim 1 wherein the distributed expert system is implemented at least in part in the form of software running on the processing element.

10. An apparatus for use in a communication system, the apparatus comprising:
    a processing element comprising a processor coupled to a memory;
        the processing element implementing at least a portion of a distributed expert system for automated resolution of communication device problems in the communication system, the distributed expert system being arranged in at least two hierarchical levels, including an upper level comprising a central controller and a lower level comprising a plurality of local agents each associated with one or more communication devices of the system;

wherein the central controller has an associated knowledge base for use in automated resolution of communication device problems in the communication system, and wherein a given one of the local agents has an associated local knowledge base which comprises only a subset of the knowledge base of the central controller.

11. An apparatus for use in a communication system, the apparatus comprising:

a processing element comprising a processor coupled to a memory;

the processing element implementing at least a portion of a distributed expert system for automated resolution of communication device problems in the communication system, the distributed expert system being arranged in at least two hierarchical levels, including an upper level comprising a central controller and a lower level comprising a plurality of local agents each associated with one or more communication devices of the system;

wherein if a given one of the local agents encounters a problem with one of its associated communication devices that is not solvable using a local knowledge base, it requests problem resolution assistance from the central controller.

12. A method for use in a processing element of a communication system, the processing element comprising a processor coupled to a memory, the method comprising the steps of:

providing at least a portion of a distributed expert system for automated resolution of communication device problems in the communication system, the distributed expert system being arranged in at least two hierarchical levels, including an upper level comprising a central controller and a lower level comprising a plurality of local agents each associated with one or more communication devices of the system; and processing at least one communication device problem utilizing at least a given one of the local agents of the distributed expert system;

wherein a given one of the local agents obtains new problem resolution knowledge without accessing the central controller.

13. The method of claim 12 wherein the distributed expert system further comprises at least a first intermediary hierarchical level arranged between the upper level and the lower level, the first intermediary level comprising a plurality of active managers, each managing one or more of the local agents.

14. The method of claim 12 wherein the distributed expert system further comprises an additional intermediary hierarchical level arranged between the first intermediary level and the upper level, the additional intermediary level comprising at least one management element responsible for managing a plurality of the active managers of the first intermediary level.

15. The method of claim 12 wherein the central controller determines, for new problem resolution knowledge it obtains, which of the plurality of local agents to which the knowledge will be distributed.

16. A method for use in a processing element of a communication system, the processing element comprising a processor coupled to a memory, the method comprising the steps of:

providing at least a portion of a distributed expert system for automated resolution of communication device problems in the communication system, the distributed expert system being arranged in at least two hierarchical levels, including an upper level comprising a central controller and a lower level comprising a plurality of local agents each associated with one or more communication devices of the system; and processing at least one communication device problem utilizing at least a given one of the local agents of the distributed expert system;

wherein the central controller has an associated knowledge base for use in automated resolution of communication device problems in the communication system, and wherein a given one of the local agents has an associated local knowledge base which comprises only a subset of the knowledge base of the central controller.

17. A method for use in a processing element of a communication system, the processing element comprising a processor coupled to a memory, the method comprising the steps of:

providing at least a portion of a distributed expert system for automated resolution of communication device problems in the communication system, the distributed expert system being arranged in at least two hierarchical levels, including an upper level comprising a central controller and a lower level comprising a plurality of local agents each associated with one or more communication devices of the system; and processing at least one communication device problem utilizing at least a given one of the local agents of the distributed expert system;

wherein new problem resolution knowledge obtained by the local agent without accessing the central controller is subsequently submitted by the local agent to the central controller for processing by the central controller so as to make said new problem resolution knowledge accessible to at least one additional local agent.

18. An article of manufacture comprising a machine-readable storage medium containing software code for use in a processing element of a communication system, wherein the software code when executed implements at least a portion of a distributed expert system for automated resolution of communication device problems in the communication system, the distributed expert system being arranged in at least two hierarchical levels, including an upper level comprising a central controller and a lower level comprising a plurality of local agents each associated with one or more communication devices of the system;

wherein a given one of the local agents obtains new problem resolution knowledge without accessing the central controller.

19. A distributed expert system for automated resolution of communication device problems in the communication system, the distributed expert system being arranged in at least two hierarchical levels, including an upper level comprising a central controller and a lower level comprising a plurality of local agents each associated with one or more communication devices of the system;

wherein a given one of the local agents obtains new problem resolution knowledge without accessing the central controller.

\* \* \* \* \*